United States Patent [19]
Rosengard

[11] 4,135,898
[45] Jan. 23, 1979

[54] DEVICE FOR CENTRIFUGALLY SEPARATING THE COMPONENTS OF A GAS MIXTURE

[75] Inventor: Alex Rosengard, Gif-sur-Yvette, France

[73] Assignee: Commissariat a l'Energie Atomique, Paris, France

[21] Appl. No.: 732,789

[22] Filed: Oct. 15, 1976

[30] Foreign Application Priority Data

Oct. 24, 1975 [FR] France ............................... 75 32643
Jun. 28, 1976 [FR] France ............................... 76 19593

[51] Int. Cl.² .............................................. B01D 51/00
[52] U.S. Cl. ................................ 55/419; 55/17; 55/459 A; 209/144
[58] Field of Search ............... 55/17, 419, 338–340, 55/459 R, 459 A, 459 B, 459 C, 459 D, 345, 349; 209/144

[56] References Cited

U.S. PATENT DOCUMENTS 1,719,119  7/1929  McKain ............................... 209/144
3,296,807  1/1967  Fekete ................................. 55/349

FOREIGN PATENT DOCUMENTS

1245329  7/1967  Fed. Rep. of Germany ......... 55/17
1150088  7/1957  France ................................. 55/17

Primary Examiner—Bernard Nozick
Attorney, Agent, or Firm—Flynn & Frishauf

[57] ABSTRACT

In a device for separating the components of a gas mixture and especially isotopic species of different masses such as $U^{235}$ and $U^{238}$, the mixture is passed through a vessel having an axis of revolution and forms a vortex, the axis of which coincides with the axis of the vessel. A plurality of openings for the admission of the gas mixture are spaced at intervals over the entire surface of the vessel. Means for withdrawing fractions enriched in one of the components of the mixture to varying degrees are centered on the axis of the vessel.

13 Claims, 17 Drawing Figures

DEVICE FOR CENTRIFUGALLY SEPARATING THE COMPONENTS OF A GAS MIXTURE

This invention relates to a device for separating the components of a gas mixture and especially for separating isotopic species of different masses of a substance in the gaseous state.

This device in accordance with the invention applies to the separation of isotopic species of different masses of a gas mixture such as for example the isotopic species $U^{235}$ and $U^{238}$ of uranium in the form of gaseous hexafluoride. However, the device in accordance with the invention is also applicable to the separation of any substances having very different masses such as, for example, the separation of hydrogen and uranium hexafluoride in a mixture of these two substances.

It is known that isotope separation of the two isotopic species of uranium $U^{235}$ and $U^{238}$ is a basic problem in the fabrication of the enriched fuel employed in the majority of nuclear reactors. In order to utilize the starting mixture containing a small proportion of uranium-235 (natural uranium), it is in fact necessary to enrich the mixture in uranium-235.

With this objective, many processes have been adopted in the prior art, especially gaseous diffusion, ultracentrifugation and so forth. This invention is concerned with a device for obtaining more efficient separation with lower capital outlay and therefore amortization costs by employing equipment of simpler design in conjunction with lower power consumption.

The present invention relates to a device for separating the components of a gas mixture in which said mixture passes through a vessel having an axis of revolution and forms therein a vortex whose axis coincides with the axis of said vessel, characterized in that a plurality of openings for the admission of the mixture are spaced at intervals over the entire surface of said vessel and that means for withdrawing fractions enriched in one of the components of the mixture to varying degrees are centered on the axis of the vessel.

In one preferential embodiment of the invention, the device comprises at least:

one stationary hollow vessel of substantially cylindrical shape, the directrix of the cylinder being a circle having a radius a, said cylindrical vessel being provided on the lateral surface thereof with a network of injection openings in the form of a series of straight or helically skewed slits parallel to each other for establishing communication between the interior of the cylindrical vessel and a source of gas mixture under pressure, the intersection of a transverse section plane of said cylinder with the longitudinal median plane or skewed plane of each slit being always a straight line at a substantially constant angle $\alpha$ with the plane which is tangent to the vessel at their common intersection with the respective transverse section plane, the ends of the slits intersecting their respective median planes or skewed planes in lines making a substantially constant angle $\beta$ with the transverse section planes of the vessel, said cylindrical vessel being closed at both ends by two covers, the network of the points of intersection of the respective median lines of said slits and said lateral surface of said vessel forming at least one parallelogram at least two sides of which are curvilinear, first means for collecting a first fraction of the gas mixture which passes out through at least one first extraction opening of at least one cover, said opening being located in the vicinity of the axis of said cylindrical vessel and, second means for collecting the gases which pass out through at least one second extraction opening located between said first opening and the periphery of a cover.

By means of this device, the gas mixture is introduced into the cylindrical vessel at high pressure and at an initial velocity V which is directed towards the interior of said cylindrical vessel; the projection of the velocity V on a transverse section of the cylinder (general velocity V having a direction which coincides with the axis A of the openings) makes a constant angle $\alpha$ with the plane $\pi$ which is tangent to the cylindrical vessel, with the result that said velocities invelop a cylinder having an axis which coincides with the axis of the cylindrical vessel and has a radius a cos $\alpha$. The angle $\beta$ between said axis A of the lateral openings and the transverse sections of the cylinder can be of zero value: in this case, the velocities V of introduction of the gas mixture are located in transverse section planes. This insertion of gas into the cylindrical vessel has the effect of generating a gas vortex within the cylinder. As a result of a centrifugation effect in the gas phase, said gas vortex makes it possible to carry out radial separation of the isotopic compounds of different mass such as uranium-235 and uranium-238. The fraction of gas mixture of lower mass, that is to say an "enriched" mixture having a higher concentration of uranium-235 in the case of an isotopic mixture of uranium is discharged from the first means mentioned in the foregoing. In the case of a feed gas mixture containing both uranium in the hexafluoride state and hydrogen, the fraction of the gas mixture which is discharged through the first collecting means is enriched both in uranium-235 and in hydrogen. On the contrary, there are withdrawn from the second extraction opening of the cover or covers which surround the first extraction opening mixtures which are concentrated in the isotopic species having the highest mass such as uranium-238 for example and depleted in uranium-235 and in hydrogen. Means for sucking the two gas fractions through said openings can include suction pumps. The gas mixture is passed through the openings of the lateral walls after having been preferentially put under pressure by one or more compressors.

As will become apparent in the following description, the injection opening network on the lateral surface of the cylindrical vessel is a network in which the lattice unit is a curvilinear parallelogram composed on the one hand of two arcs having circular directrices of length $(2\pi a/n)$ (n is an integer and can be equal to 1) and on the other hand either of segments of generating-lines of length b or of fragments of one or a number of parallel helices of length c which are cut in the surface and connect the ends of said arcs. The mixture to be separated and consisting either of uranium hexafluoride, for example, or of hexafluoride associated with a light carrier gas such as hydrogen or helium is introduced into the cylindrical vessel through the injection openings of the cylindrical surface so as to produce a constant velocity of peripheral rotation of said mixture. The injection openings of the cylindrical surface can also be constituted by helical or rectilinear slits along generating-lines. In an alternative embodiment of the invention, the injection openings can also be connected to tubes for supplying gas mixture and having the same axis as the axis A of the openings.

The vessel employed is preferentially a right cylinder having a circular directrix. It is readily apparent that the scope of the invention extends to any other type of vessel of elongated shape and circular section through which the mixture to be separated is introduced on the lateral surface in order to withdraw at the extremities fractions which are enriched to varying degrees.

In order to ensure good radial separation into light isotope and into heavy isotope, the turbulence of the gas mixture within the interior of the cylinder must not impair the efficiency of separation. To this end and in order to prevent turbulence, the Reynolds number relative to the rotational flow motion of the fluid:

$$R_e = \frac{2a.V.\rho}{\mu},$$

where
V designates the velocity of rotation of fluid at the periphery of the vortex (outside the boundary layer),
a designates the radius of the cylindrical tube,
$\rho$ designates the specific mass of the fluid,
$\mu$ designates the viscosity of the fluid, must be lower than a limiting value corresponding to the appearance of the turbulence in the gas stream.

Unexpectedly, it has been calculated that this limiting value could be higher than initially contemplated and that values of the order of 30,000 could be attained without giving rise to any disturbance in the flow as a result of turbulence which is detrimental to good isotope separation.

The addition of a predominant proportion of a light carrier gas to the isotopic mixture of uranium hexafluoride makes it possible in respect of a given pressure, temperature and velocity to reduce the value of $\rho$ with respect to the pure uranium hexafluoride and therefore to increase the diameter of 2a of the cylindrical tube employed. Furthermore, since the velocity of sound is higher in a light mixture, it is easier to obtain a higher injection velocity. In order to prevent losses of energy and turbulences related to supersonic flow, a subsonic injection velocity V is always adopted.

By virtue of the introduction of a light carrier gas, it is possible to obtain separating elements, that is, devices in accordance with the invention in which provision is made for cylindrical vessels with introduction distributed over the lateral surface and in which the dimensions specified below permit easy industrial manufacture.

In the event that use is not made of a carrier gas but only of the heavy isotopic mixture of uranium hexafluoride, for example, it is necessary to reduce the size of the cylindrical vessel to a substantial extent.

A preferential device for carrying out the invention for the isotope separation of a mixture containing a light isotope and a heavy isotope comprises three substantially concentric zones on at least one of the two covers at the extremities of the cylindrical vessel; the first of these three zones starting from the center of the cover is a zone pierced by a central extraction opening P located in the axis of the cylindrical vessel and having a radius $r_1$ through which a gas mixture enriched in light isotope is discharged; the second annular zone $S_1$ is pierced by an annular opening having a width $r_2$ which surrounds the first opening; the zone $S_1$ is generally adjacent to the zone P and a gas mixture enriched in heavy isotope is discharged through the annular opening of this zone; and finally the third zone $S_2$ is pierced by at least one opening through which is discharged a gas mixture whose composition is substantially identical to the composition of the gas mixture which is injected into the cylinder through the lateral injection openings.

Experimental and theoretical studies have made it possible to measure isotope separation profiles which determine the concentration of a given isotope of the gas mixture as a function of the radial distance measured from the axis of the cylindrical vessel and have revealed the existence of a narrow heavy-component concentration peak; the configuration of this peak will be more clearly shown in the accompanying figures. The curve which establishes the isotope separation profile as a function of the radial distance within the cylindrical vessel serves to determine with precision the ideal values of the radii $r_1$ and $r_2$. Moreover, since the isotopic and chemical concentration of the gas mixture is very close to the injection concentration over a large part of the surface of the covers, the device in accordance with the invention comprises in one advantageous embodiment means for recycling in the injection openings of the lateral surface of the cylindrical vessel or vessels the mixture which escapes through one or a number of openings located in the zones $S_2$ of the cylindrical vessels which are associated with said zones. This reduces the work of recompression since the flux which is recycled corresponds to that portion of the fluid which is located at a distance from the axis of the cylindrical vessel and which is under a lower degree of vacuum. Furthermore, the flux ratio of the streams which are discharged through the zones $S_1$ and P is reduced; it is acknowledged by those who are versed in the art that this feature is of considerable advantage. Finally, the separation of the stream into three fractions increases the separative power.

Further properties and advantages of the invention will become more readily apparent from the following description of examples of construction which are given by way of explanation but not in any limiting sense, reference being made to the accompanying drawings, wherein:

Figure 1:
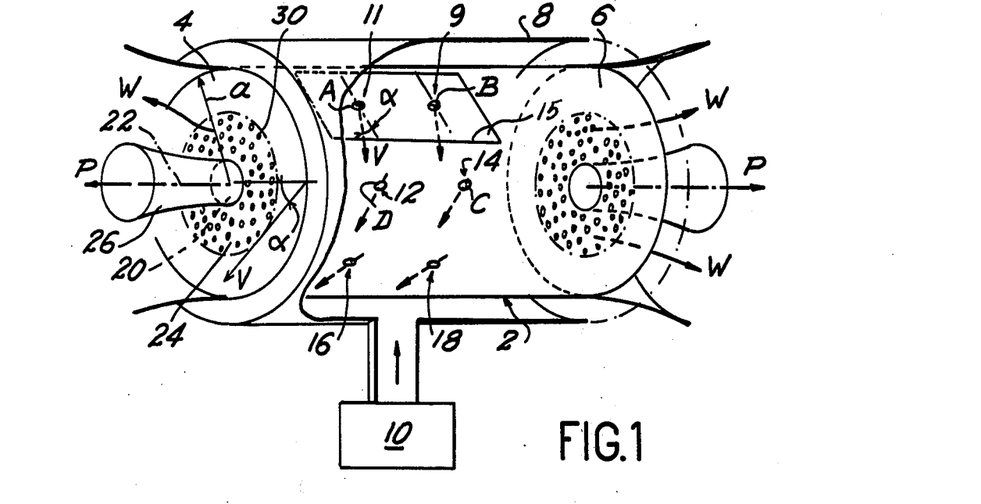
FIG. 1 shows one example of construction of the device in accordance with the invention comprising a network of openings such that the injection openings are aligned along generating-lines of the cylindrical vessel.

The device in accordance with the invention as shown in FIG. 1 comprises a cylindrical vessel 2 which is closed at both ends by identical flat covers 4 and 6. The covers can have configurations which are different from that shown in the figure, the flat structure being preferential. The cylindrical vessel 2 is surrounded by a chamber 8 which is supplied at high pressure by a compressor 10, for example. The covers such as 4 and 6 are pierced by a first axial extraction opening 20 which is concentric with the axis 22 of the cylindrical vessel and through which is discharged the enriched fraction P (in uranium-235 for example if the gas mixture delivered by the compressor 10 is a mixture containing natural uranium in the gaseous state). The fraction W which is depleted in uranium-235 escapes through the extraction openings located within the second zone 24 which surrounds the opening 20. The volumes corresponding to the flow of the differently enriched fractions are separated geometrically by the wall 26. The compressors which deliver the gas are not illustrated. Furthermore, the nozzles such as those represented by the wall 26, for example, can have a bell-shaped flare in order to ensure that the pressure existing within the interior of the cylinder can be recovered at the outlet. These bell-shaped nozzles can be associated with the openings which are cut in the covers of the cylinders when said covers are of reasonable size.

Thus in this embodiment of the invention, the gas is introduced into the interior of the cylindrical vessel 2 by means of injection openings such as those designated by the references 9, 11, 12, 14 at a velocity V which, in the case of FIG. 1, is located in a plane at right angles to the axis of the cylinder 22 (transverse section); the velocity vector V makes an angle $\alpha$ with the plane $\pi$, which is tangent to the cylinder, and passes through the associated opening. Said angle $\alpha$ is represented in the figure and can vary between 5° and 30°.

Figure 2:
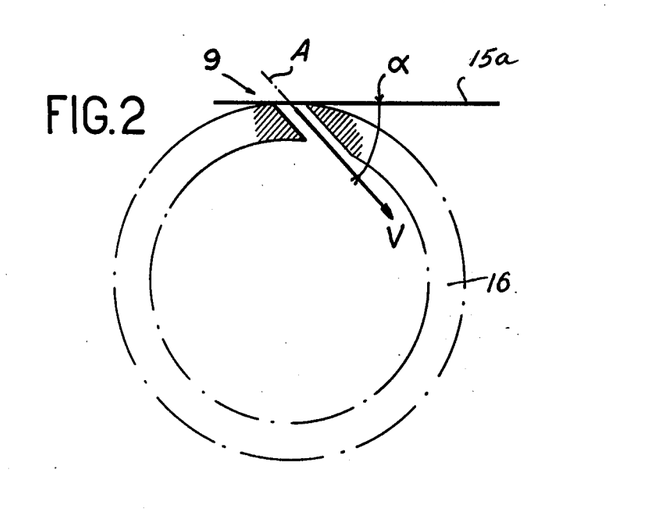
FIG. 2 is an enlarged view of a section of the cylindrical vessel.

In a preferential embodiment of the invention, the zone 24 through which the depleted fraction W is discharged is pierced by circular openings, for example. This zone has a radius which is considerably smaller than that of the envelope circle of the velocities V (as shown in FIG. 2), this circle being the trace of the envelope cylinder of the velocity vectors V. Said envelope circle 30 has a radius a cos $\alpha$, where a is the radius of the circular directrix of the cylindrical vessel. As preferred, and in order to facilitate the formation of the vortex to the maximum extent, the radial extension of the zones which are perforated in the cover will be limited to one-third of the radius of said cover. The object of this limitation of the radii of the extraction zones is to prevent an unduly high proportion of the gases from escaping through the extraction openings before being mixed with the vortex within the cylindrical vessel. The extraction openings may or may not be normal to the cover.

Thus, by virtue of the vortical flow motion of the gas mixture within the cylindrical vessel, the fraction P is the enriched fraction of low mass ($U^{235}$, for example) and the fraction W is the fraction which is depleted in $U^{235}$. The lateral injection openings are pierced at an angle $\alpha$ with respect to a radius of the director circle as will be seen more clearly in FIG. 2. The network of these openings is a lattice network A, B, C, D, where AB and DC are segments of generating-lines having a length b and where AD and BC are circular arcs having a length ($2\pi a/n$), where n is an integer equal to 6 in the case of FIG. 1. This number n must be sufficiently small to ensure that, by reason of the radius of the cylinders and diameter of the openings, the different jets are integrated with the vortical stream without directly disturbing each other. The distances a and b are determined empirically as a function of the possibilities of mechanical construction, of the hydrodynamic structure of the flow and also as a function of the gas mixture under consideration.

FIG. 2 is a sectional view of the cylinder 2 as shown in FIG. 1 and taken along a plane at right angles to the axis 22 (FIG. 1) of the cylindrical vessel, that is, a plane of transverse cross-section. The velocity V of introduction of the gases into the cylindrical vessel 2 makes an angle $\alpha$ with the trace 15a of the plane 15 which is tangent to the cylinder and passes through the opening 9, said opening being cut in the wall 16 of the cylinder so that its edges make an angle $\alpha$ with the plane 15.

It is readily apparent that the cylindrical vessel 2 in which the injection openings are pierced must have a sufficient thickness to ensure that the length of said injection openings is equal to several times their diameter.

Figure 3:
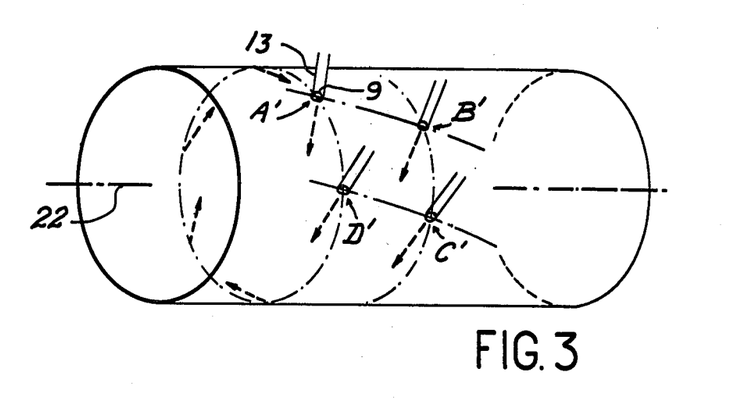
FIG. 3 shows one example of a cylindrical vessel in which the injection openings are aligned on parallel helices cut in the surface of the cylindrical vessel.

There is shown in FIG. 3 one embodiment of the invention in which the lattice unit of the network of openings A', B', C' and D' is constituted by two arcs having directrices A'D' and B'C' connected by two parallel portions of helices A'B' and D'C'. The slope of the helices is such that the generating-line which passes through the point B' is approximately the mid-perpendicular of the arc A'D': in consequence, the openings B'C' and so forth will be displaced with respect to the openings A'D' and so forth by an optimum quantity.

This figure illustrates by way of example introduction tubes as designated by the reference 13 and associated with this type of construction, said tubes being inserted in the opening 9 and the other feed inlets. The mixture is fed into said tubes from a source S of gas under pressure.

Figure 4:
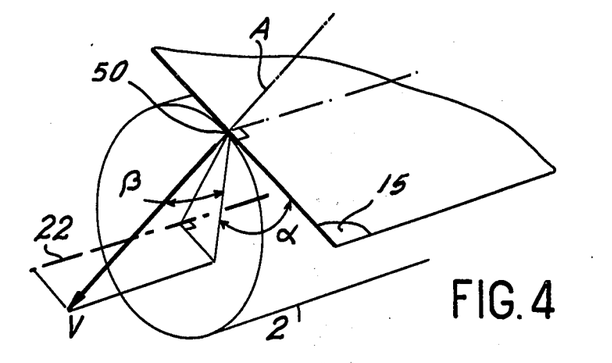
FIG. 4 is a diagram which indicates the angles defining the velocity of admission of the gas mixture into the cylindrical vessel.

FIG. 4 shows in detail the plane 15 which is tangent to the cylindrical vessel 2 in the case of an opening such that the angle between the velocity vector V and a plane of transverse section is equal to $\beta$. In accordance with the invention, the projection of said velocity vector V on the plane of transverse section makes an angle $\alpha$ with the plane 15. The velocity V of introduction of the gases at the inlet of the cylindrical tube is advantageously located outside the plane of transverse section and inclined at an angle $\beta$ such as that shown in FIG. 4 in the case in which the gas mixture is passed through the two symmetrical covers 4 and 6 as will be seen later; it can in such a case be desirable to assist the longitudinal flow motion by inclining the velocity vectors V with respect to the axis in the case of a first half of the tube and in the opposite direction in the case of the second half of the tube on each side of the mid-plane P' of the cylindrical vessel.

Figure 5:
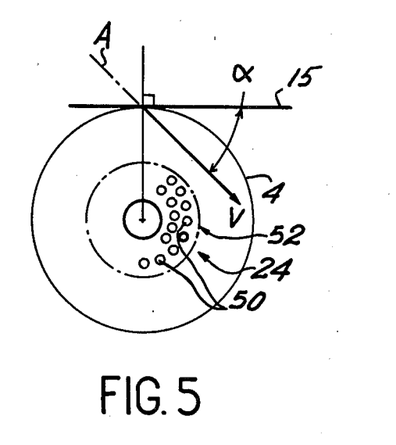
FIG. 5 shows one example of formation of the extraction openings in the covers of the cylindrical vessel.

FIG. 5 is a side view of a cover in which the enriched fraction P escapes through a first circular opening 20 in the vicinity of the center of the circular cover 4 and the depleted fraction W escapes through multiple openings such as those designated by the reference 50 and located in the annular zone 24. The total surface area of the openings is calculated so as to reduce to a negligible value the pressure drop resulting from extraction of the depleted fraction.

Figure 6:
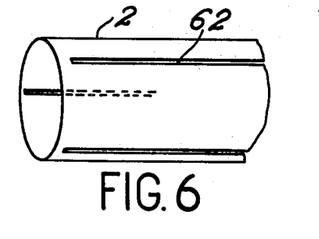
FIG. 6 shows, for comparative purpose, a device in which the injection openings are lateral slits along generating-lines of the cylinder which constitutes the vessel.

There is shown in FIG. 6 one form of construction of the cylindrical vessel 2 of FIG. 1 in which the lateral injection openings 62 are slits which are parallel to the generating-lines and the edges of which make an angle $\alpha$ with the plane which is tangent to the cylinder along said generating-lines. In the example illustrated, there are shown three slits having a width of opening of the order of a few hundredths of a millimeter.

Figure 7:
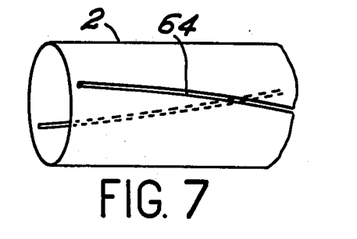
FIG. 7 shows one example of construction in which the openings are parallel helical slits cut in the cylindrical surface of the vessel.

In FIG. 7 there is shown an embodiment of the invention in which the slits are located on helices such as those designated by the references 64 and 66 which are cut in the surface of the cylindrical vessel 2. The width of the openings corresponding to the helices is of the same order as that of the openings associated with the slits parallel to the generating-lines.

Figure 8:
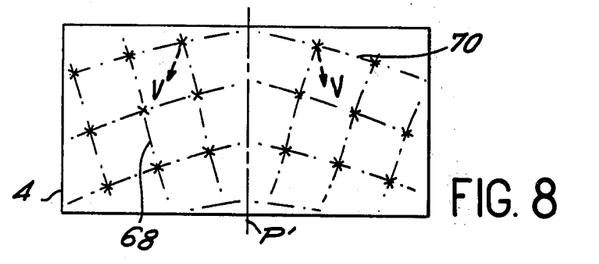
FIG. 8 shows one example of construction in accordance with the invention in which the injection openings are disposed on helices which are cut in the surface, a first portion of network being constituted by helices with a righthand pitch and a second portion of network being constituted by helices with a left-hand pitch.

FIG. 8 shows an embodiment of the invention in which the lateral-opening network is made up of two portions separated by the mid-plane P', namely a left-hand portion comprising left-hand helices such as the helix 68 and a right-hand portion comprising right-hand helices such as the helix 70. In this embodiment, the axes of the openings such as 11 make an angle $\beta$ with a transverse-section plane, said vectors V being directed on one side of the mid-plane P' in the case of left-hand helices, with the result that the gas has a tendency to escape through the openings of the cover 4; the angle $\beta$ is such that the velocities V on the other side of the mid-plane P' are antiparallel to the vector V which corresponds to the other side of the mid-plane P'.

Figure 9:
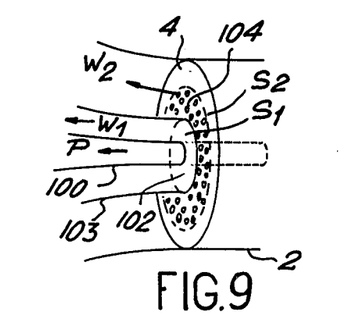
FIGS. 9, 10 and 11 show three different forms of construction of two covers which close the cylinder and serve to separate fractions which are enriched and depleted in uranium-235.

FIG. 9 shows an embodiment of the invention in which the enriched and depleted mixtures are withdrawn through the extraction openings of the covers at the ends of the cylindrical vessel; in FIG. 9, the enriched fraction P is removed by means of a small-diameter tube 100 which penetrates into the interior of the cylindrical vessel 2; a first depleted fraction $W_1$ corresponding to a first zone $S_1$ is withdrawn through an annular opening 102 which is pierced in the cover 4 whilst a second depleted fraction $W_2$ corresponding to a second zone $S_2$ passes out through the openings such as 104 of the cover 4.

Figure 10:
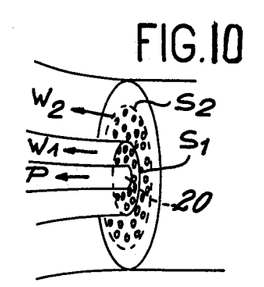

There is shown in FIG. 10 an embodiment of the invention in which the zone $S_1$ of discharge of the depleted fraction $W_1$ is also pierced by extraction openings through which a first depleted mixture is discharged; if so desired, these openings are different from the openings $W_2$ (of the zone $S_2$) through which a second depleted mixture is discharged. Only the tubes corresponding to the enriched mixture, namely the small-diameter tubes in the vicinity of the axis of the cylinder, penetrate into the interior of this latter. The annular surface $S_1$ around the zone 20 through which the depleted mixture $W_1$ is discharged can also be left solid without any opening.

In the case in which the zone $S_1$ is an open zone as shown in FIG. 9, a pressure recuperator can be associated with this zone by giving a bell shape as shown in FIG. 19 to the wall 103 which limits the zones of discharge of the depleted mixtures $W_1$ and $W_2$.

Figure 11:
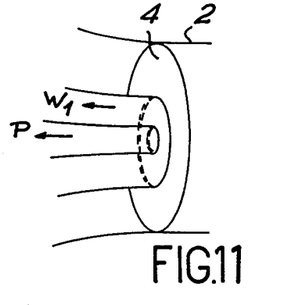

In FIG. 11, consideration has been given as in FIG. 9 to an open zone $S_1$ with which a vacuum-tight zone $S_2$ without openings is associated.

Figure 12:
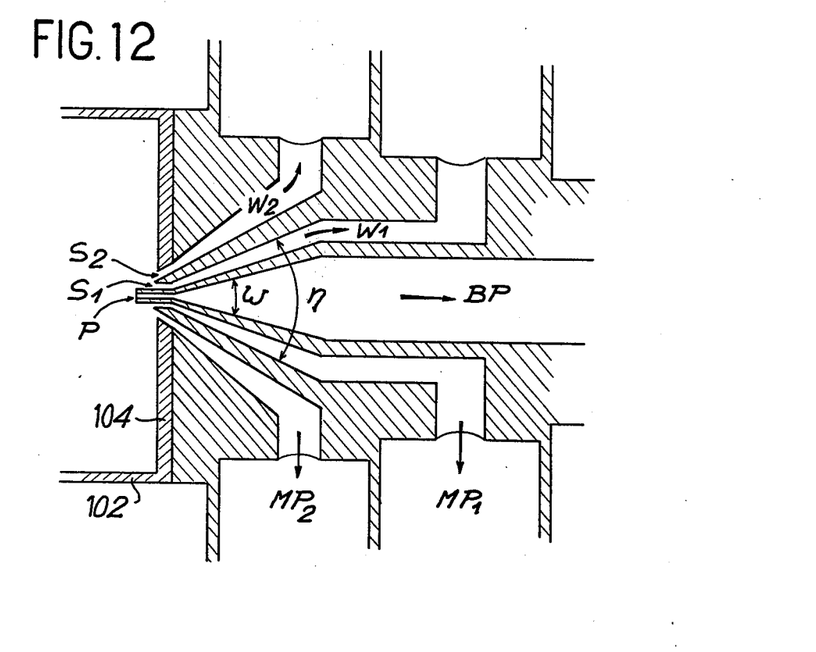
FIG. 12 is a sectional view of the extraction configuration of a cover in accordance with a preferential embodiment of the invention.

FIG. 12 is a diagrammatic sectional view of the preferential extraction device in accordance with the invention. This device comprises a cylindrical vessel 102 closed at both ends by identical flat covers such as the cover 104. In this embodiment, the injection holes (not shown) make an angle of 25° with the normal to the lateral wall of the cylindrical tube. The cover 104 is pierced by different openings, namely a first opening P through which is discharged the fraction enriched in light isotope (uranium-235, for example), the annular opening of the zone $S_1$ through which is discharged the isotope fraction $W_1$ enriched in heavy isotope and depleted in light isotope and the opening of the zone $S_2$ through which is discharged a mixture having a composition which, as will hereinafter become apparent, is very close to that of the mixture introduced through the injection tubes onto the lateral walls of the cylindrical vessel 102. Withdrawal of the mixture through the opening P is carried out by means of a hollow cylinder which penetrates into the interior of the cylindrical vessel to a slight extent. Low-pressure (LP) gases are discharged through the opening P whereas the medium-pressure gases $MP_1$ are discharged through the annular opening of the zone $S_1$ and the medium-pressure gases $MP_2$ are discharged through the opening or openings of the zone $S_2$. The angles $\omega$ and $\eta$ define the angular divergence of the extraction nozzles corresponding to the opening P and to the annular opening of the zone $S_1$.

Figure 13A:
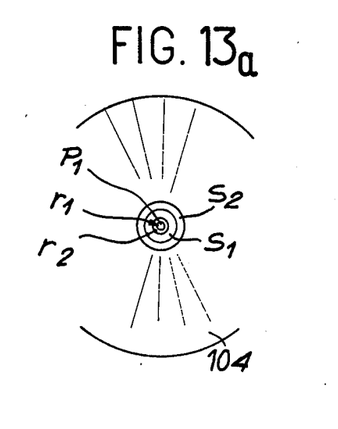
FIGS. 13a and 13b each show a side view of two preferential embodiments of the openings corresponding to the different zones of the cover or covers of the cylindrical vessel in which the isotope separation takes place as shown in cross-section in FIG. 12.
Figure 13B:
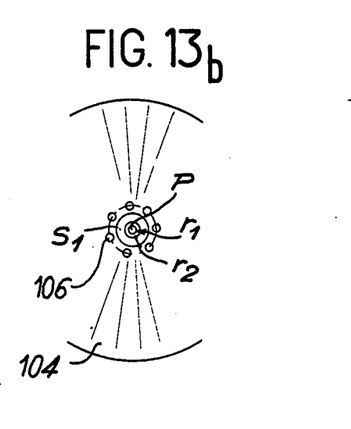

FIG. 13a is an end view showing a cover 104 with the different zones corresponding to the openings illustrated in FIG. 12; the fraction which is enriched in light element is discharged through the opening P having a radius $r_1$ whilst the fraction $W_1$ which is enriched in heavy element is discharged through the annular opening of the zone $S_1$. In FIG. 13b, there is shown another form of construction of the cover 104 in accordance with the invention in which the zone $S_1$ is also an annular zone having a width $r_2$ whilst the zone P has a radius $r_1$ and the zone $S_2$ is pierced by openings such as 6.

Figure 14:
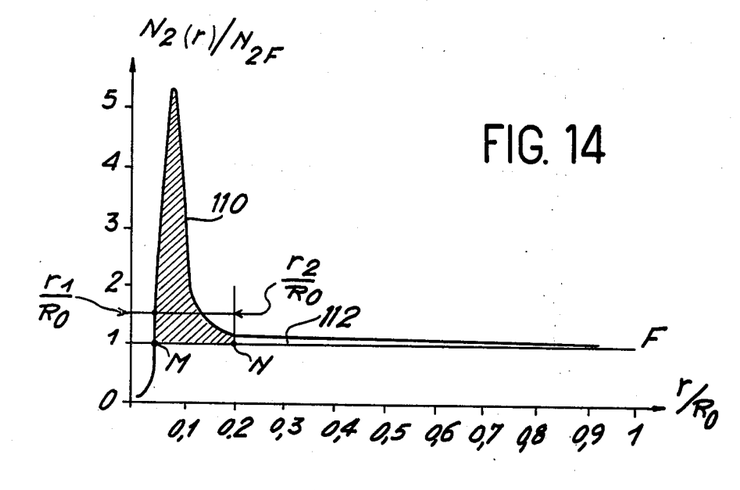
FIGS. 14 and 15 show isotope concentration profiles as a function of the radial distance with respect to the axis of the cylindrical vessel.

There is shown in FIG. 14 the curve 110 of the concentration profile of uranyl hexafluoride $UF_6$ in the mixture as a function of the ratio $r/R_O$, where r is the radial distance within the cylindrical vessel and $R_O$ is the radius of the director circle of said cylindrical vessel. The ratio $N_2(r)/N_{2F}$ has been plotted as ordinates, $N_2(r)$ being the local concentration of $U^{238}$ isotope at the distance r from the axis of the cylindrical vessel and $N_{2F}$ being the concentration of $U^{238}$ in the feed. It is apparent from this curve 110 that, in the vicinity of the center of the cylindrical vessel or in other words in the case of short radial distances, the mixture is depleted in $U^{238}$ whereas the cross-hatched zone corresponding to the concentration peak of uranium-238 extends approximately from point M to point N. The straight unity-ordinate line 112 intersects the curve 110 at a point M. This curve shows that it is advantageous but not essential to choose the ratio $(r_1/R_O)$ which determines the radius r of the opening P for extraction of the mixture which is enriched in light element so as to be approximately equal to the radial abscissa of the point M whereas the ratio $r_2/R_O$ which determines the width $r_2$ of the opening of the annular zone $S_2$ must be chosen approximately equal to the distance MN; the point N is determined for example by the radial distance in which the concentration of $U^{238}$ is higher than the concentration of the injection mixture only by 10% of the difference between this latter and the concentration of the fraction which passes through the zone $S_1$.

This criterion is not incompatible with a previous criterion which limits the radial extension of the perforated zone in the covers to ⅓ of the radius of said covers. The most suitable criterion will be chosen as a function of the different geometrical and physical parameters.

The particular shape of the curve 110 (concentration profile) of the isotope $U^{238}$ and similarly the curve 111 of FIG. 15 which is explained in detail below can be understood in terms of the following considerations:

at a point located relatively near the axis, the velocity of rotation of the vortex is of high value; this velocity of rotation varies substantially by $(1/r)$ by virtue of conservation of the kinetic moment, viscosity phenomena being neglected. On the actual axis of the cylinder, the velocity of rotation becomes zero by reason of these viscosity phenomena. The centrifugation force proportional to $(V^2/r)$ is very high and varies substantially by $(1/r^3)$, with the result that the isotopic concentration of the heaviest elements becomes higher as the distance from the phenomenon axis is greater, thus giving rise to enrichment in light element in the immediate vicinity of the axis $$\left( \frac{r}{R_0} < \frac{r_1}{R_0} \right).$$

as soon as the distance from the axis of the cylindrical vessel becomes sufficiently great, the transport phenomena produced by the injection flow through the side walls of the cylindrical vessel become preponderant, with the result that the centrifugation forces become relatively very small. Beyond the point N, the concentration of heavy element in the fluid is close to the value of the feed.

The pointed appearance of the shaded peak in FIG. 14 results in the fact that, beyond the point N, the withdrawal of fluid is carried out at a concentration which is very close to that of the feed and this permits of easy and efficient recycling. In fact, the zone $S_2$ is chosen so as to be located between the point N and the point F corresponding to the radius $R_O$. The concentration profiles have a steep character only over a distance equal to 0.2 times the radius of the cylindrical vessel. An isotope separation profile is shown in FIG. 15 on the curve 114 with the following ratio in ordinates:

$$\alpha(r) = \frac{\frac{N_1(r)}{N_2(r)}}{\frac{N_{1F}}{N_{2F}}}$$

where $N_1$ is the concentration of $U^{235}$ in the uranium hexafluoride;

$N_2$ is the concentration of $U^{238}$ isotope in the uranium hexafluoride;

F is the index corresponding to the concentrations in the feed. As in FIG. 14, the ratio $\alpha$ becomes substantially equal to unity (corresponding to the feed) in respect of $(r/R_O) > 0.2$.

In general, it proves an advantage to effect withdrawal through the different openings as near as possible to the center (all other things being equal) in order to leave a sufficient distance for the formation of the vortex without being disturbed by the different withdrawals which take place through the openings of the covers.

Figures 15, 16:
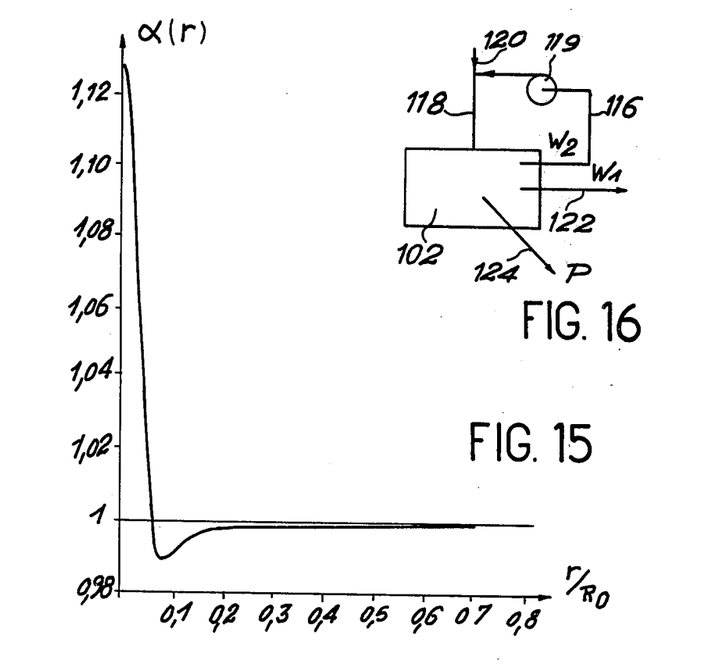
FIG. 16 is an explanatory diagram of recycling of the gases discharged through the zone $S_2$ of the cover of the cylindrical vessel.

There is shown in FIG. 16 an explanatory diagram of recycling in accordance with one embodiment of the invention. The fraction $W_2$ discharged from the cylindrical vessel 102 in which the separating vortex is rotating is recycled after recompression by the compressor 119 via the line 116 towards the supply 118 through the injection openings which direct the gas mixture onto the side walls of the cylindrical vessel 102. Part of the feed of the cylindrical vessel 102 is also delivered by the pipe 120 which is connected to a source (not shown) of gas mixture comprising the different isotopic species. The fraction $W_1$ is discharged through a pipe represented by the arrow 122 and the fraction discharged through the opening P flows in the direction of the arrow 124.

EXAMPLES OF CONSTRUCTION

The injection is carried out through 112 holes 2/10 millimeter in diameter which are spaced on a helix having a pitch of 2 cm (20 holes per turn: 5.6 turns). The injection angle is 25°, the length of the cylindrical vessel is 12 cm, the diameter of the cylindrical vessel is 1.5 cm and the thickness of the walls is 1 mm.

The extraction device comprises the opening P which is constituted by a small-diameter tube having an internal radius r (internal diameter: 6/10 mm; external diameter: 7/10 mm; length of penetration into the vessel: 5 mm) and flared in a wedge cross-section having an angle of 15° at the vertex externally of the cylindrical vessel (angle ⅔ of FIG. 12). The angle $\eta$ of FIG. 12 has a value of 30°.

FIRST SERIES OF EXAMPLES

In these examples the zone $S_1$ is an annular opening having an internal radius of 7/10 mm and an external radius of 16/10 mm ($r_2 = 4.5/10$ mm). There is no opening in the zone $S_2$. Temperature: 20° C.

Composition of the gas at the inlet: argon - 10.5% helium - 89.5%

Feed pressure HP = 2.7 bar

Enriched product outlet pressure LP – 1.1 bar.

The two isotopes of argon, helium which perform the function of carrier gas are separated in this first series.

The first case corresponds to the maximum separation obtained in the course of tests and the second case corresponds to the optimum ratio of power consumption to separative power.

| | First case | Second case |
|---|---|---|
| Depleted product outlet pressure MP (bar) | 1.55 | 1.85 |
| Real flow rate in l/s - HP | 0.613 | 0.540 |
| Real flow rate in l/s - MP | 1.000 | 0.703 |
| Real flow rate in l/s - MP | 0.058 | 0.105 |
| $N_{AMP}$ | 11.1% | 10.85% |
| $N_{ALP}$ | 4.2% | 4.8% |

|   | First case | Second case |
|---|---|---|
| -continued |   |   |
| $\alpha$ | 1.121 | 1.100 | where
$N_{ALP}$ is the molar fraction of argon of the LP enriched (light) fraction,
and $N_{AMP}$ is the molar fraction of argon of the MP depleted (heavy) fraction,
and $\alpha$ is the isotopic separation factor (enriched fraction (LP) with respect to the HP feed).

The real tests have confirmed the results of calculations. For the separation of uranium isotopes in the form of hexafluoride, optimization of calculations indicates an optimum concentration of 1.7% $UF_6$, 98.3% $H_2$ and the advantageous pressures are HP: 2.4 bar, MP: 2 bar and LP: 1.3 bar.

SECOND SERIES OF EXAMPLES

In this second series of examples, the zone $S_1$ is an annular opening having an internal radius of 7/10 mm and an external radius of 13/10 mm ($r_2$ = 3/10mm) and the zone $S_2$ is pierced by eight openings at an angle of 45° and having a diameter of 5/10 mm, the center of these openings being located at a distance of 1.45 mm from the center of the cover. Temperature: 20° C.

Composition of the gas at the inlet: argon - 13.8% helium - 86.2%

The first and the second case correspond to the same optimizations as in the first series of examples.

|   | First case | Second case |
|---|---|---|
| HP | 2.7 | 2.7 |
| LP | 1.1 | 1.1 |
| $MP_2$ (outlet pressure of $W_2$) | 2.27 | 2.36 |
| $MP_1$ (outlet pressure of $W_1$) | 1.65 | 1.85 |
| Real flow rate in l/s - HP | 0.522 | 0.470 |
| Real flow in l/s - $MP_2$ | 0.327 | 0.275 |
| Real flow rate in l/s - $MP_1$ | 0.325 | 0.250 |
| Real flow in l/s - LP | 0.093 | 0.125 |
| $N_{AMP_2}$ | 13.9% | 14% |
| $N_{AMP_1}$ | 14.4% | 14.8% |
| $N_{ALP}$ | 6.85% | 8.6% |
| $\alpha$ | 1.083 | 1.056 |

In describing FIG. 3 it was mentioned that the injection openings are aligned on "parallel helices" and likewise the slits of FIG. 7 were described as "parallel helic 1 slits". Particularly when, as in the illustrated examples, the helices referred to are of relatively large pitch, they may be regarded as skewed planes and it is convenient to refer to the longitudinal edges of the slits cut into the rather thick cylindrical vessel as skewed planes, which mean of course that the longitudinal median of the slit will also be a skewed plane. What might be referred to as the axis of the slit will then be a median line midway between the ends of the skewed plane that is the median longitudinal plane of the slit and, as explained above, this line or axis will have an angle $\beta$ with the family of planes perpendicular to the axis of the cylinder.

What we claim is:

1. A device for separating the components of a gas mixture, in which said mixture passes through a vessel having an axis of revolution and forms therein a vortex whose axis coincides with the axis of said vessel, wherein a plurality of openings for the admission of the mixture are spaced at intervals over the entire surface of said vessel except for its ends and wherein means for withdrawing fractions enriched in one of the components of the mixture are located in the ends of the vessel and are centered on the axis thereof, said device comprising:

a stationary hollow vessel of substantially cylindrical shape, the directrix of said cylinder being a circle having a radius a, said cylindrical vessel being provided on the lateral surface thereof with a network of injection openings in the form of a series of helically skewed slits parallel to each other for establishing communication between the interior of the cylindrical vessel and a source of gas mixture under pressure, the intersection of a transverse section plane of said cylinder with the median skewed plane of each slit being always a straight line at a substantially constant angle $\alpha$ with the plane which is tangent to the vessel at their common intersection with the respective transverse section plane, the ends of the slits intersecting their respective median skewed planes in lines making a substantially constant angle $\beta$ with the transverse section planes of the vessel, said cylindrical vessel being closed at both ends respectively by two covers, the network of the points of intersection of the respective median lines of said slits and said lateral surface of said vessel forming at least one parallelogram at least two sides of which are curvilinear, first means for collecting a first fraction of the gas mixture which is discharged through a first extraction opening of each said cover, said extraction opening being located in the vicinity of the axis of said cylindrical vessel, and second means for collecting the gases which are discharged through at least one second extraction opening located between said first extraction openings and the periphery of the respective cover, in which said at least one of the second extraction openings is situated, and spaced from said periphery of the cover to isolate gases removed from the cover with respect to gases admitted to the vessel.

2. A device according to claim 1, wherein said at least partly curvilinear parallelogram is composed of two arcs each of a circular directrix of said cylindrical vessel and two parallel fragments of helix each connecting corresponding ends of the respective arcs.

3. A device according to claim 2, wherein the network of said intersection points is constituted by two portions separated by a midplane at right angles to the axis of the cylindrical vessel and wherein said fragments of helices forming at least one parallelogram correspond in a first of said portions to helices having a first direction of rotation and in a second of said portions to helices having a direction of rotation opposite to the first.

4. A device according to claim 3 wherein, in the first portion of one side of said mid-plane at right angles to the axis of the cylindrical vessel, the angle $\beta$ is such that the portions of the slit median lines which are internal to the cylinder are located within the space formed between the mid-plane and the cover which is associated with said first portion and wherein, in the second portion on the other side of said mid-plane, the slit median lines are in mirror image directions with respect to said mid-plane.

5. A device according to claim 1, wherein at least one of said two covers placed respectively at the ends of the cylindrical vessel provides extraction openings for collecting gases which are respectively located in three substantially concentric zones: namely a first zone pierced by a central extraction opening (P) or radius $r_1$ serving said first collecting means, located in the axis of the cylindrical vessel, and through which a gas mixture enriched in light isotope is discharged; a second zone ($S_1$) pierced by an annular opening of width $r_2$ which surrounds the first opening (P) and through which a gas mixture enriched in heavy isotope is discharged, and a third zone ($S_2$) pierced by at least one opening through which is discharged a gas mixture whose composition is substantially identical to the composition of the gas mixture which is injected into the cylinder through said injection openings, said openings of said second and third zones serving said second collecting means.

6. A device according to claim 5, wherein said device further comprises means for recycling into said network of injection openings of the wall said cylindrical vessel at least part of the gas mixture which is discharged through at least one opening located in at least one said third zone ($S_2$) of a cover of said cylindrical vessel.

7. A device according to claim 1, wherein the median lines of said slits are located in planes at right angles to the axis of the cylindrical vessel, so that $\beta = 0$.

8. A device according to claim 1, wherein said first means for collecting gas fractions comprises a central circular opening of each of said covers.

9. A device according to claim 8, wherein said second means for collecting gas fractions comprises a zone ($S_1$) adjacent to said central circular opening of each of said covers, said zones of said covers being pierced by small separate extraction openings.

10. A device according to claim 8, wherein said second means for collecting gas fractions comprises a zone ($S_1$) adjacent to said central circular opening of each cover, and each said zone ($S_1$) is provided with an annular extraction opening.

11. A device according to claim 8, wherein said first means for collecting gas fractions comprises a central circular opening in each of said covers and in which said second means for collecting gas fractions comprises a set of openings in first annular zones ($S_1$) respectively adjacent to said circular openings and also a set of openings for collecting another gas fraction in second annular zones ($S_2$) of said covers adjacent to said first annular zones, said second annular zones ($S_2$) being pierced by small openings of said second set.

12. A device according to claim 1, wherein a tube having, for a substantial length thereof an axis that is a continuation of the slit median line is associated with each injection slit for supplying the gas mixture.

13. A device according to claim 1, wherein the first extraction opening of each cover of the cylindrical vessel comprises a hollow annular tube which penetrates into the interior of said vessel and the axis of which concides substantially with the axis of the cylindrical vessel.

* * * * *